Aug. 30, 1960

W. J. BOWAN 2,950,928

INSULATED PIPE JOINT

Filed Dec. 17, 1957

INVENTOR
WALTER J. BOWAN

BY *Cushman, Darby & Cushman*
ATTORNEYS

United States Patent Office 2,950,928
Patented Aug. 30, 1960

2,950,928

INSULATED PIPE JOINT

Walter J. Bowan, Decatur, Ill., assignor to Mueller Co., Decatur, Ill., a corporation of Illinois Filed Dec. 17, 1957, Ser. No. 703,437

4 Claims. (Cl. 285—52)

This invention relates to pipe joints or couplings and, more particularly, to a pipe joint having electrical insulating means interposed between interfitting tubular members to prevent electrolytic action therebetween.

Electrically insulated pipe joints or couplings are known in the art, but constructions presently in use usually have one or more disadvantages or imperfections. Among such disadvantages may be mentioned the fact that known constructions do not have adequate pull out strength, that is, sufficient resistance to forces tending to pull the interfitting tubular members apart. If this disadvantage is overcome, and a construction is provided that has adequate pull out strength, the electrical insulation frequently fails, or leaks develop.

Accordingly, it is an object of the present invention to provide an improved electrically insulated pipe joint or coupling of the packed socket type which has increased pull out strength.

Another object of the present invention is the provision of a pipe joint or coupling of the type described which is leakproof under all normal operation conditions and which retains all its electrical insulating characteristics over greatly extended periods of time.

Another object of the present invention is the provision of a pipe joint or coupling of the type described which is simple in construction and economical to manufacture and maintain.

These and other objects of the present invention will become more apparent during the course of the following detailed description and appended claims.

The invention may best be understood with reference to the accompanying drawings wherein an illustrative embodiment is shown.

Figure 1:
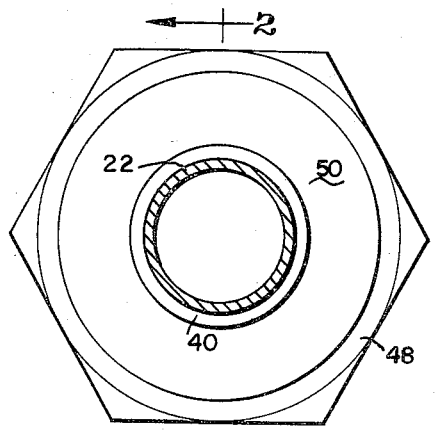
Figure 1 is a cross-sectional view through a pipe showing the coupling of the present invention embodied therein.
Figure 2:
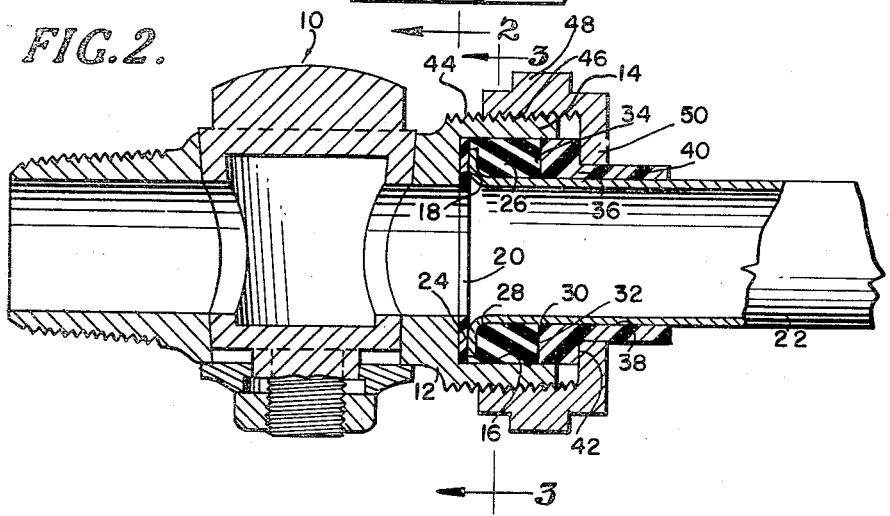
Figure 2 is a cross-sectional view taken along the line 2—2 of Figure 1.
Figure 3:
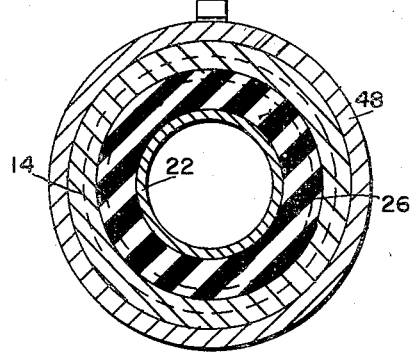
Figure 3 is a cross-sectional view taken along the line 3—3 of Figure 2.

Referring now more particularly to the drawings, it will be understood that the present coupling may be utilized to interconnect any two tubular elements and, as shown, the coupling is embodied in a corporation stop installation.

The installation includes a conventional corporation stop, generally indicated at 10, which may be of any suitable construction and forms no part of the present invention, except to illustrate a specific example within which the coupling of the present invention may be embodied. The hollow casing or body 12 of the stop 10 has a terminal portion 14 at one end thereof provided with an annular packing recess 16, which terminates at its inner end in an annular shoulder 18.

Disposed within the recess in engagement with the shoulder 18 is a washer 20. Preferably, the washer is of flat-ring configuration and is made of a relatively rigid, electrical insulating material, such as laminated Fiberglas, e.g., glass fibers impregnated with a polyester resin, for example, styrene modified ethylene glycol-maleic anhydride type alkyd or the like.

A pipe 22 extends within the recess 16 in the hollow body and has its inner end deformed outwardly to form an exterior enlargement or radial flange 24 of smaller diameter than the recess 16 disposed in engagement with the outwardly facing surface of the washer 20. A gasket 26, preferably of sleeve configuration and made of a resilient, electrical insulating material, such as natural or synthetic rubber or the like, e.g., butadiene styrene and butadiene-acrylonitrile, is mounted within the recess 16 and includes an interior surface 28 in engagement with the outwardly facing surface of the flange 24 and the adjacent exterior surface of the pipe 22. The gasket 26 also includes an exterior cylindrical surface 30 which fits tightly within the recess and engages the walls thereof and an outwardly facing end wall 32 which engages an inwardly facing end wall 34 of a follower 36.

The follower 36 is preferably made of a rigid, electrical insulating material which is highly resistant to moisture absorption, such as a high strength plastic or the like. A preferred example of such plastic is phenolic plastic produced under the trademark Insurok, i.e., phenol-formaldehyde or phenol-furfural. As shown in the drawings, the follower is of generally sleeve-shaped construction and includes an interior cylindrical surface 38 disposed in surrounding engagement with the exterior surface of the pipe 22. The inwardly facing end wall 34 of the follower is disposed within the recess 16 and the follower extends outwardly of the recess and has an extension 40 of reduced outside diameter which forms an annular shoulder 42 on the follower disposed outwardly beyond the outer end of the recess 16.

The exterior surface of the hollow body 12 is threaded, as at 44, to receive interior threads 46 of a coupling nut 48. The coupling nut includes a radially inwardly extending flange portion 50, which encircles the extension 40 of the follower and engages the annular shoulder 42 thereof.

It will be seen that the corporation stop installation of the present invention is assembled by first inserting the washer 20 within the recess 16 until it is in engagement with the annular shoulder 18. Next, the pipe 22 is extended within the recess until the annular flange 24 engages the outwardly extending face of the washer 20. The gasket 26 is then moved within the recess in surrounding engagement with the pipe 22 until it engages the outwardly facing surface of the flange 24 thereof. Next, the follower is moved within the recess until the inner end wall 34 thereof engages the outwardly facing end wall 32 of the gasket. Finally, the coupling nut is threaded on the hollow body and tightened, which effects movement of the follower inwardly of the recess, thus compressing the flexible gasket 26 against the interior wall of the recess and the exterior surface of the pipe flange 24.

In operation, it will be seen that the electrical insulating properties of the washer 20, gasket 26 and follower 36 effectively insulate the pipe 22 from contact with the hollow body 12, so as to prevent the possibility of electrolytic action therebetween. The gasket 26, which is of resilient electrical insulating material, is completely confined when the coupling nut 48 is tightened to thereby move the follower into engagement therewith. The follower is of a high-strength plastic material having relatively low moisture absorption properties and relatively high electrical resistance properties. With this construction, creepage of the joint is virtually non-existent at pressures far in excess of normal working pressures. The pull out strength of the joint approaches that of a conventional pipe coupling.

The provision of a 90° flange on the inner end of the pipe serves to improve the resistance of the coupling to being pulled out. In this regard, it will be noted that the relatively rigid washer 20 engages the flange 24 to thereby insulate the same from the hollow body and maintain the pipe in position. The completely confined gasket engages the opposite surface of the flange, as well as the adjacent exterior surface of the pipe. The gasket is backed by the follower, which, in turn, is retained in position by the coupling nut 48. Because of the resistance to water absorption of the follower 36, the electrolytic action between the pipe and the follower nut is reduced to a minimum. Moreover, minor shifting of the joint and/or small annular displacement of the hollow body with respect to the pipe 22 will not affect the sealing capabilities of the joint.

It will be understood that in many corporation stop installations, the pipe 22 will be made of a metal dissimilar to the metal of the hollow body 12 and coupling nut 48. The packing assembly of the present installation, including the washer 20, the gasket 26, and the follower 36, serves to insulate such members and effectively prevents electrolytic action while, at the same time, providing the connection with strength approaching that of a conventional pipe connection and freedom from creepage and leakage. While the coupling has been disclosed in connection with a corporation stop installation, it will be understood that it may be utilized to effect a strong, leakage- and creepage-free connection between any two tubular members where the possibility of electrolytic action is present.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a pipe joint, the combination comprising: a hollow body having a terminal portion provided with an annular packing recess terminating at its inner end in an annular shoulder surrounding a concentric opening formed in said body, a relatively thin washer of electrical insulating material disposed in said recess in engagement with said shoulder and forming an abutment for the inner end of a radially extending flange on the inner end of a pipe extending within said recess, a resilient gasket of electrical insulating material disposed in said recess, said gasket having an inner end wall engageable with the outer end of the pipe flange, an outer end wall, an exterior surface extending between said walls engageable with the interior surface of said recess, and an interior surface extending between said walls engageable with the exterior surface of the pipe extending outwardly of the flange, a rigid follower of electrical insulating material having an inner end wall disposed within said recess in engagement with the outer end wall of said gasket, said follower extending outwardly of said recess with a reduced outside diameter outwardly beyond the outer end of said recess to form an outwardly facing annular shoulder thereon, and a coupling nut exteriorly threaded on said body and having a portion encircling said follower extension and engaging said follower shoulder, said washer and said gasket in operative position defining a flange receiving annular groove of a diameter less than the diameter of said recess, said gasket and said follower in operative position defining an interior cylindrical pipe engaging surface extending from said annular groove outwardly beyond the encircling portion of said nut, said cylindrical surface having a radius equal to the radius of said body opening plus the thickness of said annular groove.

2. The combination as defined in claim 1 wherein said washer comprises a ring of glass fibers impregnated with resin.

3. The combination as defined in claim 1 wherein said gasket comprises a cylindrical sleeve of rubber.

4. The combination as defined in claim 1 wherein said follower comprises a sleeve of plastic material.

References Cited in the file of this patent

UNITED STATES PATENTS

| 299,206 | Deavs | May 27, 1884 |
| 764,603 | Lambert | July 12, 1904 |
| 936,840 | Wells | Oct. 12, 1909 |
| 1,869,915 | Sample | Aug. 2, 1932 |
| 2,257,385 | Keegan | Sept. 30, 1941 |
| 2,278,479 | Parker | Apr. 7, 1942 |
| 2,560,263 | Wiegand | July 10, 1951 |
| 2,794,658 | Purkhiser | June 4, 1957 |
| 2,837,351 | Bailey | June 3, 1958 |
| 2,850,299 | Risley | Sept. 2, 1958 |

FOREIGN PATENTS

| 1,047,939 | France | July 29, 1953 |
| 718,350 | Great Britain | Nov. 10, 1954 |